United States Patent [19]

Rioux et al.

[11] Patent Number: 4,864,169

[45] Date of Patent: Sep. 5, 1989

[54] POLYPHASE VARIABLE RELUCTANCE MOTOR

[75] Inventors: Christian Rioux, Sceaux; Roger Guillet, Paris; Jean Lucidarme, Sainte Genevieve des Bois; Jean Roche, Chilly Mazarin; Jean Pouillange, Gressy en France, all of France

[73] Assignee: Centre National de la Recherche Scientifique, Paris, France

[21] Appl. No.: 911,457

[22] Filed: Sep. 25, 1986

[30] Foreign Application Priority Data

Sep. 27, 1985 [FR] France ............................ 85 14363
Sep. 27, 1985 [FR] France ............................ 85 14365

[51] Int. Cl.⁴ .......................................... H02K 41/00
[52] U.S. Cl. ...................................... 310/12; 318/135
[58] Field of Search .................. 310/12, 13, 15, 17, 310/22; 318/135

[56] References Cited

U.S. PATENT DOCUMENTS 2,797,346  6/1957  Ranseen .
3,225,228  12/1965  Roshala ............................ 310/12
3,707,924  1/1973  Barthalon ....................... 310/12 X
4,126,797  11/1978  Kling ................................. 310/12
4,721,873  1/1988  Stenudd ............................ 310/12

FOREIGN PATENT DOCUMENTS 196052  5/1938  Switzerland .
625291  9/1978  U.S.S.R. .

Primary Examiner—R. Skudy
Attorney, Agent, or Firm—Fleit, Jacobson, Cohn, Price, Holman & Stern

[57] ABSTRACT

A polyphase variable reluctance electric motor is provided which may be of the linear or rotary type. It has a stator with m windings (34, 36, 38) creating a magnetic flux in the direction of movement of the mobile core and a source (40, 42) for energizing the windings with a differential phase shift, each winding being associated with its own ferromagnetic circuit completed through the core, characterized in that the core has several ferromagnetic first blades (18) parallel to the direction of movement and each split up in the longitudinal direction into first studs (20) having a given pitch p and in that the ferromagnetic circuit of each winding includes interleaved second blades alternating with those of the core and split up into second studs (14) at the same pitch p.

5 Claims, 8 Drawing Sheets

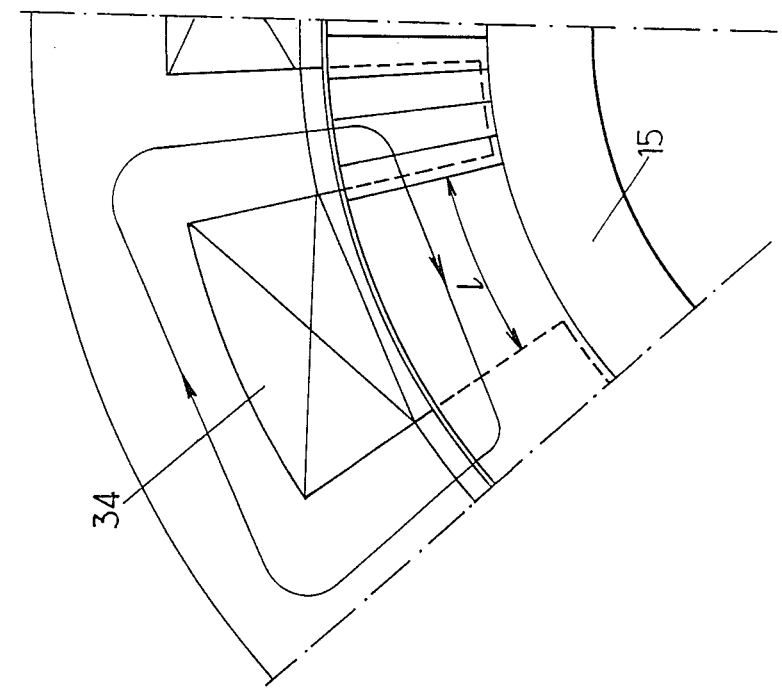
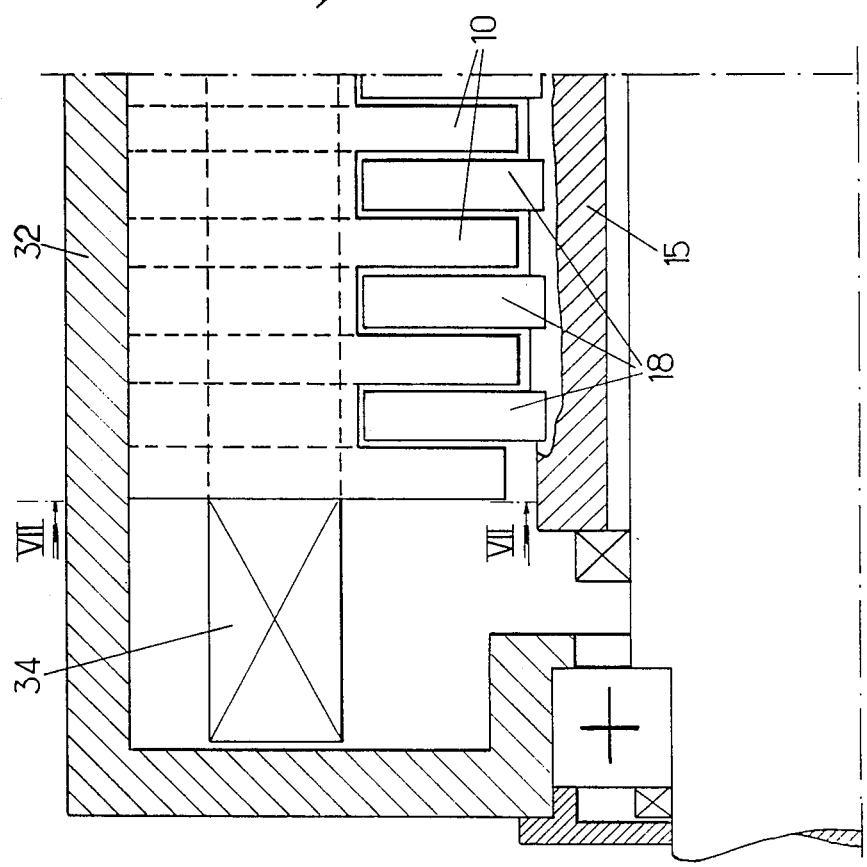

ial reluctance motors comprising a ferromagnetic core movable within a stator having m windings (m being at least equal to 2). Each winding creates a magnetic flux in the direction of the movement of the mobile core. A power source energizes the windings with a differential phase shift of $2\pi/m$, each winding being associated with one separate ferro-magnetic circuit completed through the mobile core. A particularly important, although not exclusive application, is found with high thrust delivering linear motors.

POLYPHASE VARIABLE RELUCTANCE MOTOR

BACKGROUND OF THE INVENTION

This invention relates to polyphase variable reluctance motors comprising a ferromagnetic core movable within a stator having m windings (m being at least equal to 2). Each winding creates a magnetic flux in the direction of the movement of the mobile core. A power source energizes the windings with a differential phase shift of $2\pi/m$, each winding being associated with one separate ferro-magnetic circuit completed through the mobile core. A particularly important, although not exclusive application, is found with high thrust delivering linear motors.

SUMMARY OF THE INVENTION

It is an object of the invention to provide an improved electric motor delivering a higher specific force per mass unit of ferromagnetic material than in prior art electromagnetic devices.

To this end, the invention provides an electric motor of the above-defined type whose mobile core includes a plurality of thin ferromagnetic blade-like sections or blades, hereafter referred to as first sections or first blades parallel to the direction of movement of the mobile core, each of said first blades being split up in the longitudinal direction of movement into a plurality of ferromagnetic portions, hereafter referred to as first studs or bodies according to a predetermined pitch p and the ferromagnetic circuit of each winding also comprises a plurality of blade-like sections or blades of second sections which are small thickness as compared to their length, hereafter referred to as second blades, alternating in a direction perpendicular to the direction of movement with the first blades of the mobile core and split up into segments or ferromagnetic second studs according to the same pitch p as the pitch of the studs of the mobile core.

The invention also provides a device having the second studs of the stator respectively comprising one or several permanent magnets. For example, the second studs are formed with a ferromagnetic strip and two longitudinal permanent magnets with opposite magnetization disposed on each side of said strip.

The second studs are separated from each other by a ferromagnetic portion preferably of the same length in the direction of the movement of the mobile core than the length of the ferromagnetic strip of the second stud itself.

The successive magnets belonging to two different adjacent second studs have opposite magnetization.

In applications of the invention to a linear electric motor, different first and second blades constructions are possible. In a first embodiment, the first blades are carried by a, web forming a pusher or thruster and made from a non-ferromagnetic material, for example, from stainless steel; each winding is respectively associated with a set of ferromagnetic second blades of the stator, the second blades of a whole set being off-set by p/m with respect to another set (where p is pitch spacing between ferromagnetic portions of the blades and m is the number of winding). In a preferred embodiment from the manufacturing point of view, each first and second blade consists in an alternance of ferromagnetic metal and non-magnetic metal. An alternance of silicon steel areas or soft iron, and stainless steel areas is particularly suitable. Identical blades may be produced in brazing under vacuum alternated studs formed of silicon steel and ferromagnetic materials at a temperature around 550° C. The bar obtained is then cut longitudinally so as to provide blades whose thickness may be easily reduced to about 1 mm.

In applications of the invention to a rotary machine, the windings may be energized with an a.c. current only (for rotary motor). The coils may also be devided into two groups, one energized with d.c. current, the other being energized with a.c. current, a.c. and d.c. currents may also be added in the same windings.

SHORT DESCRIPTION OF THE DRAWINGS

The invention will be better understood from reading the following description of particular embodiments, given by way of non-limitative example. The description refers to the accompanying drawings in which:

FIG. 1 is a general diagram showing the first and second studs of a linear device according to a first embodiment of the invention, FIGS. 2 and 3 are diagrams showing two respective equilibrium positions of first and second blades of the linear device according to FIG. 1, FIG. 4 is a sechmatic front view in partial section showing the overall construction of a linear device or motor formed according to the principle of functioning appearing in the linear device of FIG. 1.

FIG. 5 is an isometric and partial view of a motor of the type shown in FIG. 4,

FIG. 6 is a schematical view of a fraction of a rotary motor according to another embodiment of the invention, in section through a plane passing through the linear axis of said rotary motor, FIG. 7 is a section through line VII—VII of FIG. 6, Fig. 8 shows, the main parts of a linear motor which is an alternative to the embodiment of FIG. 4 in section through a plane including the axis of the linear motor parallel to the direction of movement of said linear motor, FIG. 9 is a sectional view through line IX—IX of FIG. 8, FIG. 10 shows in cross-section a second blade of a stator which may be used in the motor of FIG. 8, FIG. 11 shows a second blade of a polyphase motor according to the a preferred embodiment of the invention, including permanent magnets.

FIG. 12 is a sectional view through a plane including the axis of the mobile core, of the main parts of a linear motor with permanent magnets and two coils.

DETAILED DESCRIPTION OF PREFERRED EMBODIMENTS

Figure 1:
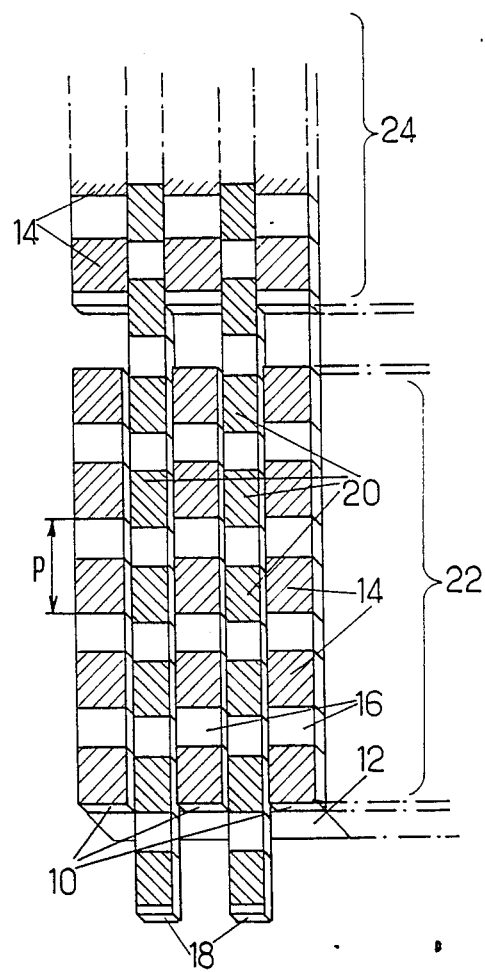

Referring to FIG. 1, there is schematically shown the ferromagnetic elements, capable of relative movement, of a linear motor which is a particular embodiment of a variable reluctance electric motor of the invention. The stator of this motor includes a large number of parallel stator second blades or second sections 10 held together by carrying means 12 made from a non-ferromagnetic material. Three second blades 10 only are shown in FIG. 1 but the number could be considerably higher in practice. Each of the second blades 10 is split up into independent second studs or ferromagnetic segments 14 spaced apart at regular intervals according to a given pitch p in a first direction of mobile core movement. Isolating zones 16 will in general be provided between the second studs so as to improve mechanical strength of the second blade. These zones will be shorter, in the first direction of movement of the mobile core, than the studs.

The mobile part of the motor is formed by a mobile core having a plurality of parallel first blades or first sections 18, imbricated or interleaved with the stator second blades 10 and comprising separate first studs or ferromagnetic portions 20, spaced apart according to the same pitch p as second studs 14. The mobile blades 18 are joined together by means not shown in FIG. 1 and their length must be greater than that of second blades 10, by an amount governing the possible amplitude of blade movement. The clearances between adjacent blades 18 and 10 are as reduced as possible.

Figure 2:
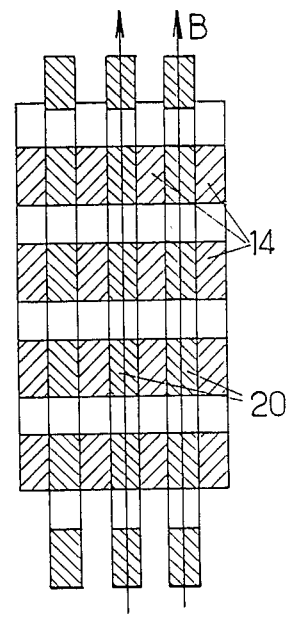

Together, the stator and the mobile core has two balanced or equilibrium positions in a field of magnetic flux lines B extending parallel to or in a first direction of the blades movement. One of such positions, shown in FIG. 2, is in unstable balance and corresponds to the maximum reluctance of the magnetic circuit through which pass the lines of force of a field created by an external winding not shown. The second balance position (FIG. 3) is stable and corresponds to a staggered arrangement of studs 14 and 20.

Figure 3:
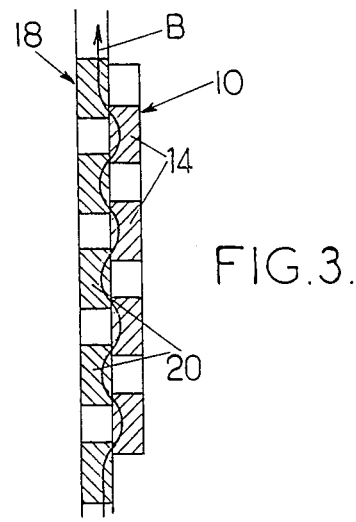

If the magnetic field characterized by flux lines B is applied when studs 20 are slightly displaced from the unstable balance position, as shown for example in the arrangement shown in FIG. 1, the magnetic induction tends to bring these studs into the position of maximum flux shown in FIG. 3: first blades 18 of the mobile core then move until the first studs are in the staggered position or the opposed position shown in FIG. 3. If then the induction field formed by flux lines B is cut off, the blade remains in the new position.

When it is desired to exert a permanent propulsive force on the mobile core and control the direction of movement of said mobile core, it is necessary to provide successive sets of studs 20 of a number n, greater than or equal to 3, such as module 22 which has just been described. The different modules may be placed in series or in parallel. In FIG. 1 a fraction of a second module 24 has been shown, in series with the first one. The windings creating the flux will then be respectively energized with respective differential phase shifted by T/n currents, T being the period of the currents. And the second studs 14 of two successive stators will be shifted by p/n.

In giving to second studs 14 a lamellar shape whose height is greater (generally at least by one order of magnitude) than its thickness, it is possible to form a polyphase machine having a great number of working surfaces. The breaking down into finite elements numerical calculation shows that electromagnetic forces generated per working surface unit are of the same order of size as those obtained in the variable reluctance devices of another type. Consequently, in increasing the number of blades and studs so as to have a large working surface, appreciably increased specific thrusts (per mass unit of ferromagnetic material) may be obtained and, for a same weight, comparable thrust to those of fluid pressure devices may be obtained.

Figure 4:
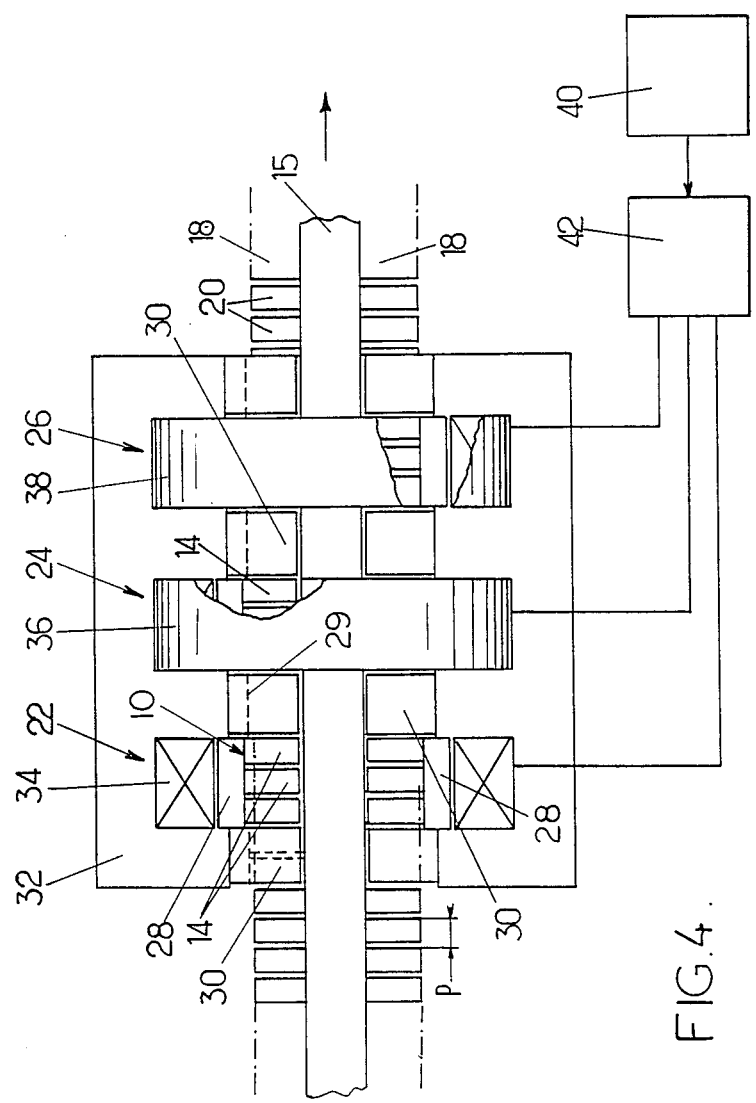

FIG. 4 shows a possible embodiment of a 3-phase linear motor according to the principle of the linear motor of diagram of FIG. 1. For this reason, the parts in FIG. 4 already shown in FIG. 1 are designated by the same reference number.

The mobile core of the motor has a non-magnetic web 15, made for example from stainless steel, which carries two opposite sets of first blades or sections 18, each set having for example five parallel first blades. (see also FIG. 5) These first blades have a small thickness, advantageously of the order of a millimeter. They are made from a magnetic material and are fixed permanently to web 15, for example by embedding and silver brazing. The blades are cut into regularly spaced ferromagnetic portions or first studs as aftermentioned 20, the first studs of the two sets facing each other. The spacing pitch p of first studs 20 (p being the dimension of a stud along first direction of movement increased by the gap between two successive studs) will in general be between 0.5 and 4 times the thickness of the first blade. It can be seen that the first studs thus take on the form of thin laminae. The gaps between successive laminae may be filled with an insulating material.

The stator includes two symmetrical parts with respect to the axis of the pusher formed by the web 15, and is formed by three modules 22, 24 and 26. These modules being identical, only module 22 will be described. In module 22, each part of the stator includes a support piece 28 made from a non-magnetic material to which the corresponding second studs 14 are brazed. The length of supports 28 determines the working zone or range of the motor. The blades provided in the three working zones are longitudinally separated by additional blades 30 also fixed but not split up into studs. These additional blades 30 complete the magnetic circuit of a support body 32 on which are mounted windings 34, 36 and 38 belonging respectively to modules 22, 24 and 26. The support body 32 is formed of metal sheets joined together and made from a ferromagnetic material. One metal sheet of said body out of two is arranged to project into the gap which separates two successive second blades 10 belonging to the stator and ends in the immediate vicinity of the corresponding first blade 18 of the mobile core, as indicated with a longitudinal dotted line 29 on FIG. 4. It can be seen that, with this arrangement, the whole of the cross-section of the body may be used for transmitting the flux, whereas only a fraction of the cross-section at the level of the stator blades is used for transmitting the flux. This arrangement appreciably reduced the space required by the body.

The stator blades of module 24 are off-set by p/n with respect to those of module 22 and module 26.

Windings 34, 36 and 38 are associated with a power supply circuit which may comprise a d.c. source 40 and a sequencer 42 delivering cyclic pulses at regular intervals to the windings. This sequencer is already well known in the art, (referred to as a commutator for example in U.S. Pat. No. 3,707,924 to Barthalon et al), the details of which form no part of the present invention. Such sequencer may be controlled by a sensor detecting movement of the core.

Figure 5:
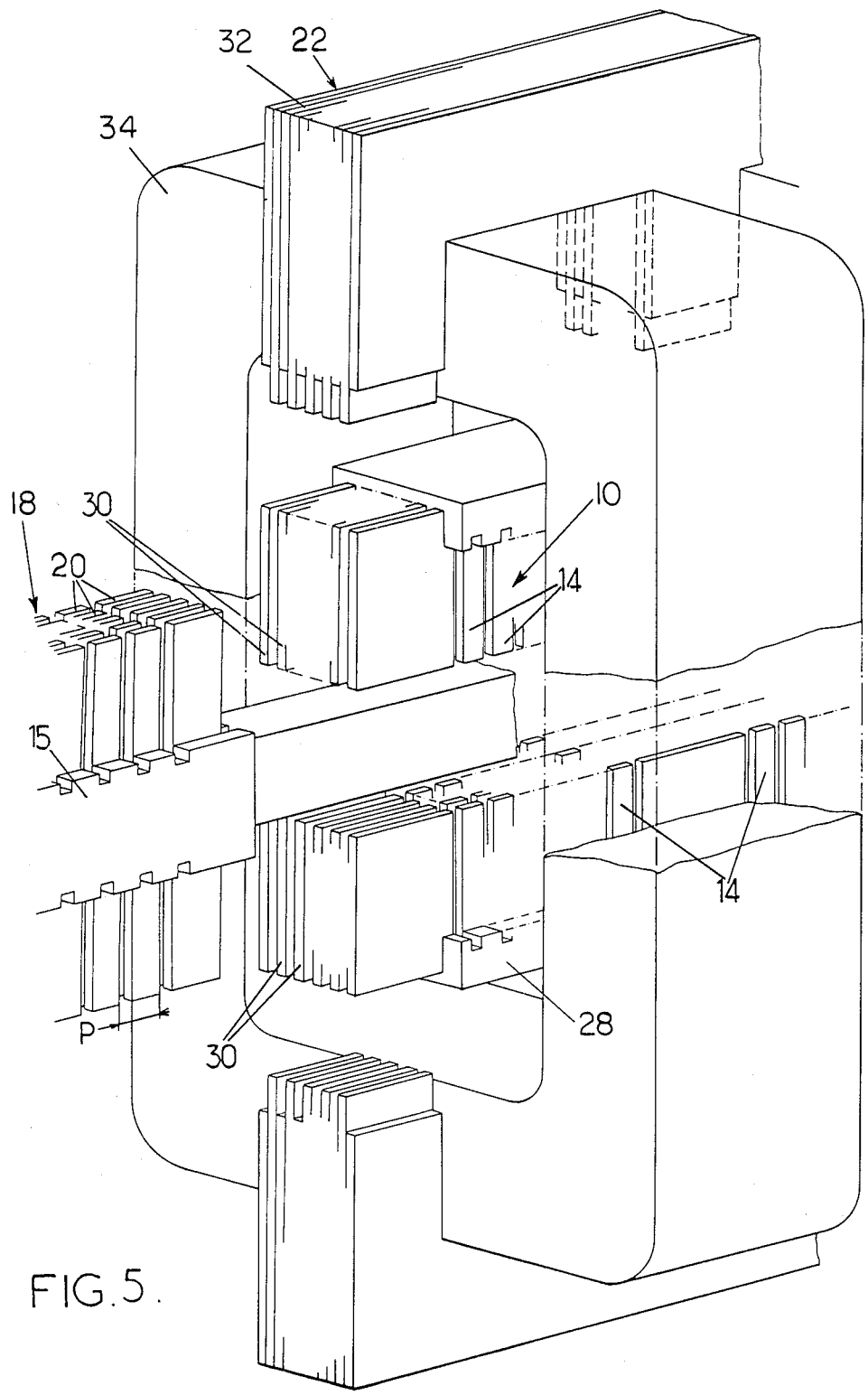

FIG. 5 shows a single inductor winding 34 carried by the circuit allowing the closure of the excitation field, formed by support body 32 made from stacked metal sheets. These metal sheets have a thickness corresponding to that of the blades. They may be imbricated in the additional blades 30 belonging to the stator so as to provide better circulation of the flux in another embodiment of the stator (not shown on FIG. 5). Additional blades 30 consequently have a height greater than that of second blades 10. Finally, the support body is mounted in a frame, not shown, having slides for guiding the emobile core.

It can be seen that the range of movement may be made as large as desired, simply by increasing the length of first blades 18. So as to avoid having length reducing the rigidity, several motors may also be disposed end to end or in parallel.

The invention also allows azimuthal field rotary machines to be constructed, simply by closing on itself the linear structure which has just been described. FIGS. 6 and 7 show a possible construction of such a machine. The blades then have the form of parallel metal discs. FIG. 6 shows such second blades 10 belonging to the stator, alternating, in a second direction perpendicular to the first direction of movement with first blades 18, also disc-shaped, belonging to the mobile core, formed by a rotor. The return circuit is again formed by a support body 32. FIG. 7 shows the form taken by the magnetic field flux lines B when the studs of the blades are in conjunction in the circumferential development zone 1 where the reluctance variations occur. This arrangement, as the preceding one, may be modified so as to obtain a Vernier effect. In the above-described embodiments, the laminae are separated with non-magnetic zones (air). If, from the electromagnetic point of view, a quite satisfactory structure is obtained, the manufacture is complex. There will now be described, with reference to FIGS. 8 to 10, a linear motor, whose stator and rotor blades have a construction simpler to manufacture.

Figure 8:
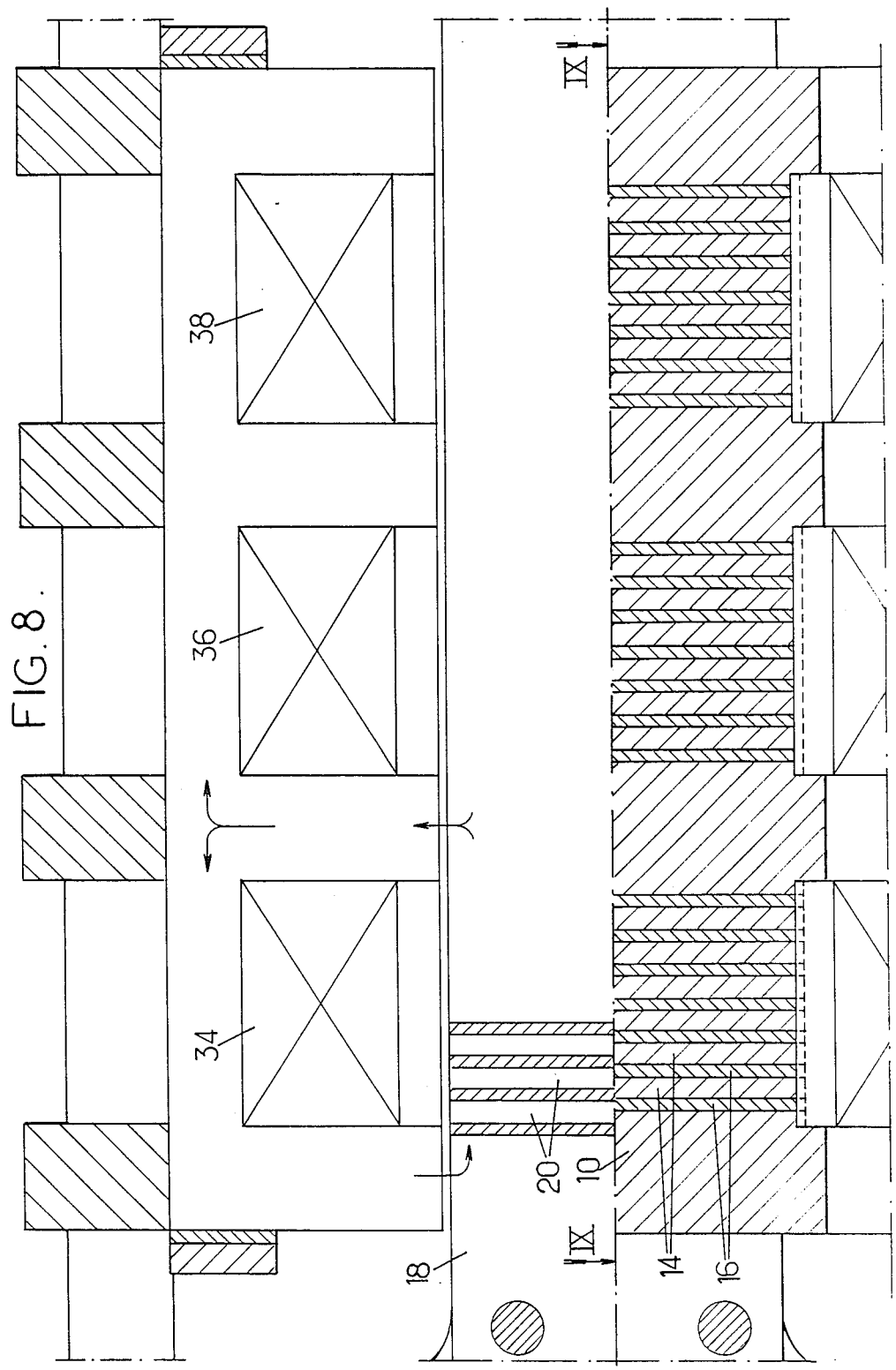
Figure 9:
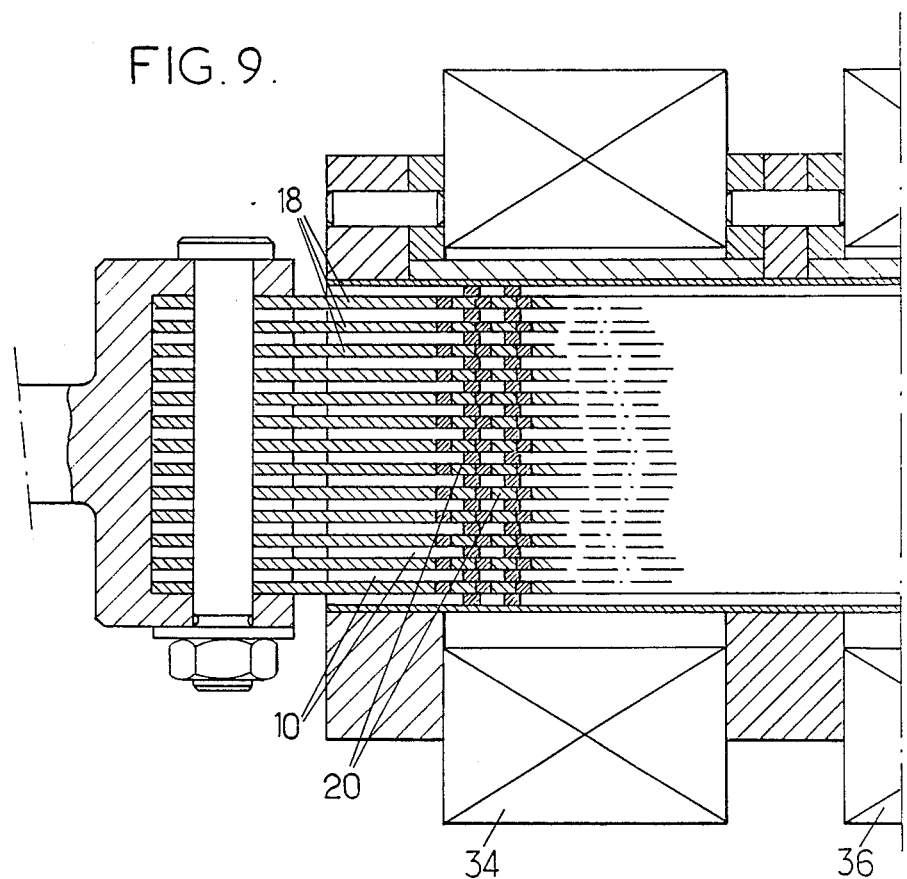
Figure 10:
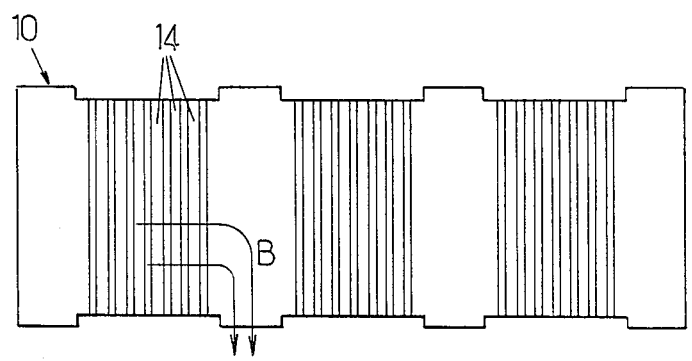

It can be seen in FIGS. 8 and 9, where the parts corresponding to those of FIGS. 4 to 6 are designated by the same reference numbers, that the first blades of the mobile core are formed by alternating ferromagnetic laminae (made from silicon iron, for example) and non-mangetic laminae (stainless steel for example) which filled the gaps occupied by air in the preceding embodiment. The ferromagnetic laminae will generally have a length in the direction of movement of the mobile core approximately twice the length of the non-magnetic laminae. The thickness of the laminae will genrally be of the same order of magnitude than the length of the non-magnetic laminae.

The blades may be manufactured as follows: a stack of ferromagnetic and non-magnetic blades alternatively disposed is provided. All the blades are firmly secured together in a vacuum while remaining below the Curie point, for example by silver brazing or electron beam welding. Then the stack is cut to the thickness desired for the blades.

The blades may be assembled in an absolutely conventional way, in holding them between strap bolts.

The blades of the stator may have the same constitution as those which have just been described, thereby providing inserts having an increased length in the direction of movement of the mobile core so as to correspond to the gap between the coils. These inserts are formed from a ferromagnetic material and must have a dimension such that they allow the flux to pass during operation without reaching magnetic saturation.

This same constitution of the blades may be used in the case of a rotary machine. In this case, the gaps separating the blades, shown in FIG. 7, will be filled by a non-ferromagnetic metal material such as stainless steel and the whole set of laminae will be assembled together in the form of an annular disc having alternate sectors, for example made from ferrosilicon and stainless steel. This arrangement, like the preceding one, may be modified so as to obtain a Vernier effect.

Figure 12:
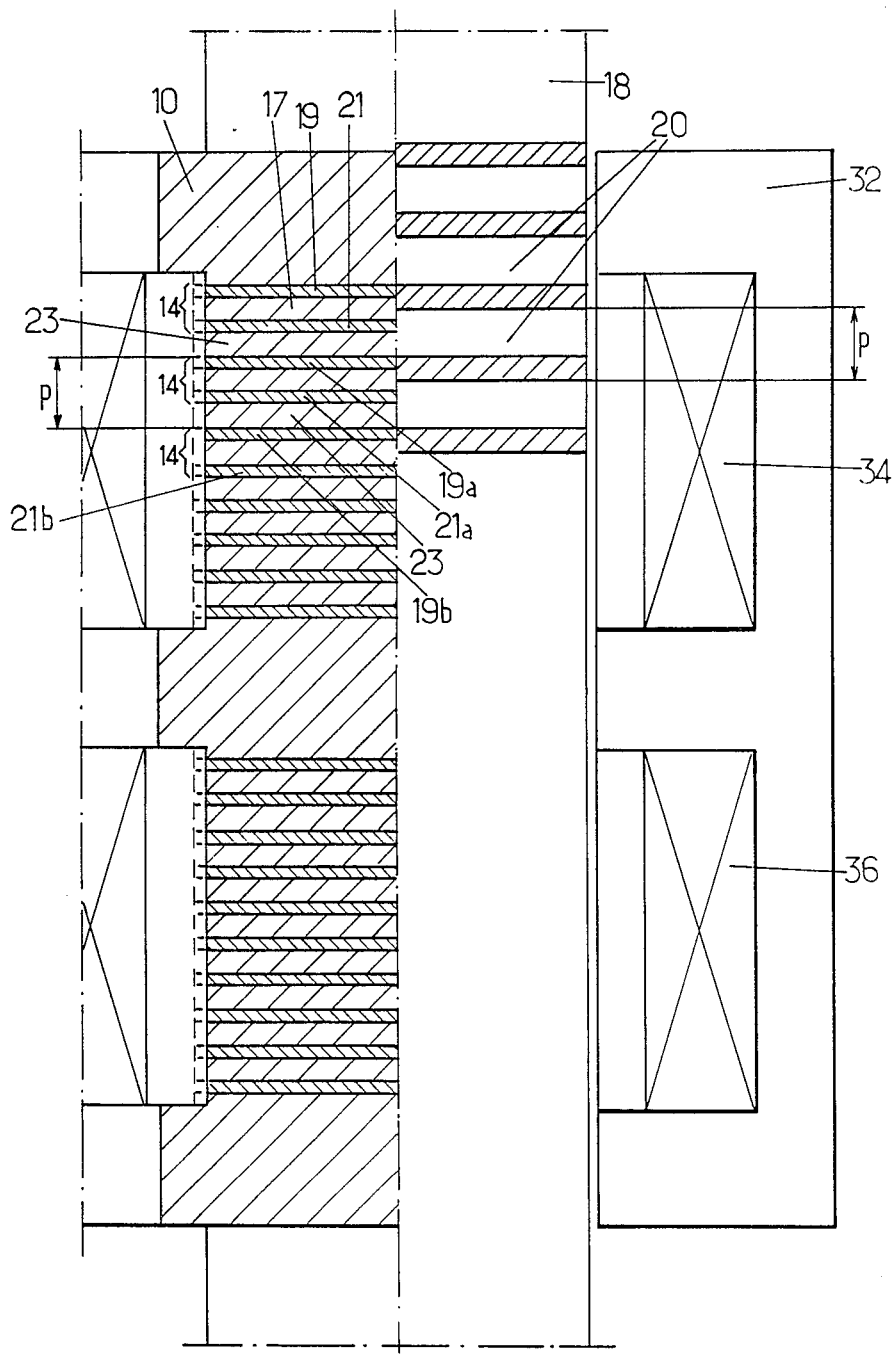

Referring to FIG. 12, there is shown a linear motor according to the invention having second studs 14 of second blades 10 of the stator which comprise longitudinal permanent magnets (19, 21) with opposite magnetization disposed on each side of a central ferromagnetic strip 17.

The second studs 14 are separated from each other by a ferromagnetic portion 23.

The successive magnets 21 and 19a, 21a and 19b etc. belonging to two different adjacent second studs 14 have opposite magnetization.

The first blades 18 and, more generally the rest of the device, may be identical to those of the variable reluctance motor without permanent magnets.

It is possible, however to reduce the number of coils 34, 36 to two with a motor according to the invention and which includes permanent magnets.

Referring to FIG. 12, the device shows first studs 20 of the mobile core of the same length in the direction of the movement of said mobile core as the length of the second studs 14 of the stator.

Figure 11:
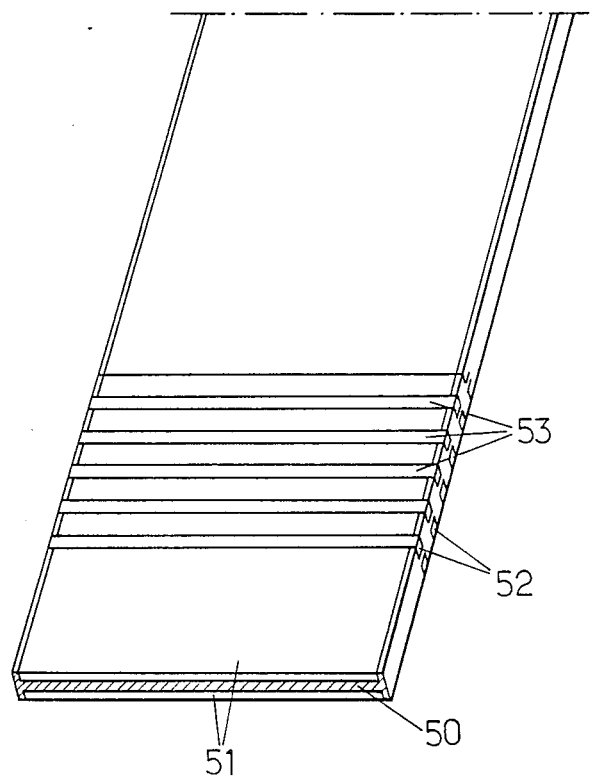

The manufacturing of the second blades of the stator including permanent magnet may be the following:

Referring to FIG. 11, two magnetic steel plates 51 are respectively inserted on each side of a non-magnetic steel I beam 50. It could be done by silver brasing or by simply stucking the plates in place. Then plates may be longitudinally laminated or not, according to the frequency of the energizing currents.

Nicks 52 are then faced by milling or electro-erosion. Permanent magnets 53 are then included in said nicks and stuck in place with successive respective opposite magnetization.

The invention is obviously not limited to the particular embodiments which have been shown and described and it should be understood that the scope of the present invention extends to any variant remaining within the field of equivalences.

We claim:

1. A polyphase variable reluctance linear electric motor comprising a ferromagnetic mobile core movable in a first direction and having a plurality of first sections extending parallel to said first direction, each of said first sections being divided into a plurality of ferromagnetic portions spaced from each other in said first direction by a predetermined pitch p, a stator within which the mobile core is movable, comprising a plurality of m windings arranged for respectively and separately creating, when energized, a magnetic flux having magnetic lines extending through the mobile core in said first direction, and a plurality of second sections arranged to be alternatively disposed between said first sections and extending between said first sections in a second direction perpendicular to the first direction, said second sections being divided into a plurality of ferromagnetic segments spaced from each other in said first direction by said predetermined pitch p, and electric power source means for energizing the windings with respective phase shifted currents.

2. The linear electric motor according to claim 1 wherein each of the ferromagnetic portions and each of the ferromagnetic segments have a dimension in the first direction substantially larger than the dimension, in said first direction, of spaces separating successive ferromagnetic portions and the ferromagnetic segments.

3. The linear electric motor according to claim 1, wherein the first sections are carried by a web forming a pusher amd made from a non ferromagnetic material and wherein each of the windings is respectively associated with a set of the second sections of the stator, the second sections of one of the sets being off-set by p/m with respect to another of the sets.

4. The electric motor according to claim 3 wherein for each linear of the windings, the web of the mobile core carries two opposite sets of the first sections and two sets of the second sections respectively corresponding to each of the opposite sets of the first sections and directly associated to each of said windings and wherein said windings are carried by a supporting body for completing the magnetic circuit, said carcass having additional sections separating the second sections directly associated to one of said windings from the second sections directly associated to an adjacent winding.

5. The linear electric motor according to claim 1 wherein the windings are associated with energizing means for supplying an a.c. current and a d.c. current.

* * * * *